United States Patent

Breslow

[15] 3,657,047
[45] Apr. 18, 1972

[54] ADHERING WITH AZIDO ISOCYANATE COMPOUNDS

[72] Inventor: David S. Breslow, Wilmington, Del.
[73] Assignee: Hercules Incorporated, Wilmington, Del.
[22] Filed: Sept. 22, 1969
[21] Appl. No.: 860,018

[52] U.S. Cl..............................156/322, 156/329, 156/331, 156/110 A, 161/190, 260/75 TN, 260/349
[51] Int. Cl......................................... C09j 5/06, C09j 3/16
[58] Field of Search..............260/349, 75 TN; 156/331, 329, 156/322; 161/190

[56] References Cited

UNITED STATES PATENTS

| | | | |
|---|---|---|---|
| 3,045,036 | 7/1962 | Jex et al. | 156/331 X |
| 3,282,864 | 11/1966 | Bost et al. | 260/2.5 |
| 3,371,002 | 2/1968 | Reddeman | 156/244 |
| 3,445,326 | 5/1969 | Hurst | 161/207 |
| 3,453,108 | 7/1969 | Delzenne et al. | 96/35.1 |
| 3,462,268 | 8/1969 | Danhauser et al. | 96/35.1 |
| 3,468,751 | 9/1969 | Tesoro | 161/193 |
| 3,515,616 | 6/1970 | Miyamoto et al. | 156/330 |

FOREIGN PATENTS OR APPLICATIONS 1,126,177  9/1968  Great Britain..........................260/349

*Primary Examiner*—Carl D. Quarforth
*Assistant Examiner*—E. A. Miller
*Attorney*—John W. Whitson

[57] ABSTRACT

Sulfonazide-isocyanate compounds of the formula

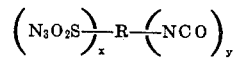

where R is a polyvalent aliphatic radical and x and y are integers from 1 yo 10 are used to adhere polymers to substrates selected from siliceous materials, metals and other polymer substrates. Rubber tires are reinforced with polyester tire cord which has been modi¾ed with a sulfonazide-isocyanate compound.

5 Claims, No Drawings

ADHERING WITH AZIDO ISOCYANATE COMPOUNDS

This invention relates to a new class of organic compounds and to certain uses for the new compounds. In particular this invention relates to a new class of sulfonazide-isocyanate compounds and their use in modifying polymers, cross-linking polymers, and improving the adhesion of polymers to certain substrates.

The unique compounds of this invention are represented by the formula

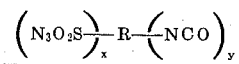

wherein R is a polyvalent aliphatic radical and $x$ and $y$ are integers broadly each being 1 to 100, preferably each being 1 to 10. Generally R will be selected from the group consisting of the saturated and unsaturated aliphatic, and cycloaliphatic hydrocarbon, hydrocarbon-oxy-hydrocarbon, hydrocarbon-thio-hydrocarbon and hydrocarbon-sulfonyl-hydrocarbon polyvalent, radicals and the corresponding halo-substituted radicals. It will, of course, be obvious to those skilled in the art that R can contain other functional groups, which are substantially inert to the reactions in which these compounds are used, such as esters, amides, etc. In preferred embodiments of this invention R will be an aliphatic or cycloaliphatic radical selected from the group consisting of radicals derived by the removal of two or more hydrogen atoms from alkanes such as, for example, ethane, propane, butane, isobutane, pentane, and its isomers, hexane and its isomers, octane and its isomers, decane and its isomers, dodecane and its isomers, octadecane and its isomers, and the like; cycloalkanes such as, for example, cyclopropane, cyclobutane, cyclopentane, cyclohexane, cyclooctane, and the like; alkylcyclo-alkanes such as, for example, ethylcyclohexane, methylcyclobutane, and the like; di-alkyl cycloalkanes such as, for example, 1,2-, 1,3 - and 1,4-dimethylcyclohexane, 1,2- and 1,3-dimethylcyclopentane, and the like; the alkyloxy alkanes such as, for example, diethyl ether, propyl butyl ether, and the like; as well as the corresponding thio- and sulfonyl compounds; and the foregoing compounds with fluoro, chloro, bromo and iodo substituents. In addition to the above radicals, R can be an aromatic substituted aliphatic radical where the sulfonyl azide group or groups attach to the aliphatic portion of the radical. Aromatic radicals substituted directly with sulfonyl azide groups are to be avoided because of their instability and propensity to color formation. When a sulfonazide-isocyanate compound of this invention is to be used as a coupling or cross-linking agent for polymers, R preferably will be substantially inert to the coupling or cross-linking reaction.

Specific compounds of this invention represented by the foregoing generic formula include:
7-chloro-4-heptanesulfonyl azide
3chloro-7-isocyanato-2-heptanesulfonyl azide
9-isocyanato-2,6-nonanedisulfonyl azide
1,9-diisocyanato-4-nonanesulfonyl azide
4-azidosulfonylbutyl-4'-isocyanatobutyl sulfone
5-isocyanatopentanesulfonyl azide
4-isocyanatophenoxy-3-propanesulfonyl azide
4-isocyanatocyclohexanesulfonyl azide The sulfonazide-isocyanate compounds of this invention range from liquids to solids at room temperature and atmospheric pressure. They have characteristic infrared spectra, containing a strong azide band at about 2140 cm$^{-1}$, a strong isocyanate band at around 2270 cm$^{-1}$ and sulfonyl bands at about 1365 cm$^{-1}$ and 1165 cm$^{-1}$. The sulfonyl azide radicals of the compounds of this invention become reactive when heated. As the temperature increases the overall decomposition rate of the sulfonyl azide increases. The isocyanate portion of these compounds on the other hand, is heat stable, thus the azido radicals can be decomposed by heating without affecting the isocyanate radicals. The azide radicals readily react with receptive polymers and combine therewith. They also combine with ethylenically unsaturated hydrocarbon groups in a variety of compounds. The isocyanate radicals can react at room temperature with water, amines, and alcohols.

The sulfonazide-isocyanate compounds of this invention can be prepared by various methods for example, they can be prepared from the corresponding sulfonyl chloride-carbonyl chloride compounds by reaction with sodium azide followed by heating to rearrange the carbonyl azide to the isocyanate. This preparation can be shown as follows

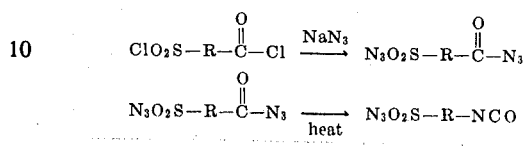

where R is as defined above. The first step in the reaction, i.e. the reaction with sodium azide, is conducted at a temperature below 10° C. in a mixed solvent such as acetone-water, ethyl alcohol-water, methyl chloride-acetone-water, benzene-acetone-water, etc. The second step of the reaction, i.e. the rearrangement of the carbonyl azide to the isocyanate, is carried out at temperatures of up to 100° C. in an inert solvent such as benzene, toluene, etc. The sulfonyl chloride-carbonyl chloride intermediates mentioned above can be prepared in several ways. For example, they can be prepared by the chlorosulfonation of the corresponding carbonyl chloride compounds as follows

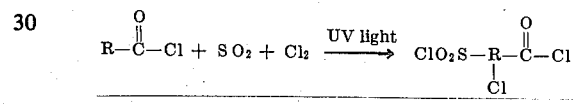

where R is as defined above. It should be noted that this method results in some chlorination of the R group. Another method which can be used is the reaction of the corresponding sulfonic acid-carboxylic acid with thionyl chloride as follows

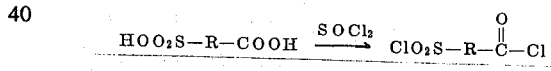

where R is as defined above. The reaction with thionyl chloride, is generally carried out at a temperature of from about 20° C. to about 100° C. with an excess of the thionyl chloride acting as a solvent or with some inert solvent such as methylene chloride, ethylene dichloride, toluene, xylene, etc.

As indicated above, this invention includes the use of the unique sulfonazide-isocyanate compounds in modifying polymers, cross-linking polymers, and improving the adhesion of polymers to various substrates. All of these modifications of the invention involve the reaction of the sulfonazide-portion or portions of the sulfonazide-isocyanate compounds with a receptive polymer. In this specification receptive polymer means a polymer having in each polymer chain at least one and generally more than one monomer unit capable of combination reaction with a sulfonazide radical of a compound of this invention, whereby the residue of the compound is chemically bonded to the polymer. Nearly all polymers are receptive polymers. Preferred examples of a receptive polymer include all types of hydrocarbon polymers including saturated and unsaturated, linear and non-linear, crystalline and amorphous homopolymers, copolymers, terpolymers, and the like; for example, polyethylene, polypropylene, polystyrene, styrene-butadiene rubber, butyl rubber, natural rubber, polybutadiene, polyisobutylene, ethylene–propylene copolymer, cis-1,4-polyisoprene, ethylene–propylene–dicyclopentadiene terpolymer and the like; and blends of these polymers with each other and blends of these polymers with organic non-hydrocarbon polymers. In addition to the hydrocarbon polymers preferred examples of a receptive polymer include a large number of organic non-hydrocarbon polymers including homopolymers, copolymers, terpolymers, and the like. Typical of these organic non-hydrocarbon polymers are cellulose esters, such as, for example, cellulose acetate-butyrate, cellulose-acetate-propionate, cellulose acetate, cellulose propionate, cellulose butyrate, and the like; polyesters such as poly(ethylene glycol terephthalate), drying and non-drying alkyd resins and the like; poly(alkylene oxide) polymers such as poly(ethylene oxide), poly(propylene oxide), poly(ethylene oxide-propylene oxide); polyamides such as nylon, and the like; allyl pentaerythritol derivatives such as, for example, the condensate of triallyl pentaerythritol with diallylidene pentaerythritol, esters of triallyl pentaerythritol and drying oil fatty acids, and the like; poly(vinyl alkyl ethers) such as, for example, poly(vinyl methyl ether) and the like; poly(vinyl acetals) such as, for example, poly(vinyl butyral) and the like; vinyl chloride polymers having a vinyl chloride content of at least 10 mole percent such as, for example, poly(vinyl chloride), vinyl chloride–vinyl acetate copolymers, vinyl chloride–vinylidene chloride copolymers, vinyl chloride–vinyl acetal copolymers, such as, for example, the vinyl chloride–vinyl butyral copolymers, vinyl chloride–vinylidene chloride–acrylonitrile terpolymers and the like; nitrocellulose; chlorinated natural rubber, sulfochlorinated polyethylene; polysulfide rubber; polyurethane rubber; poly(vinyl acetate); ethylene–vinyl acetate copolymers, poly(vinylidene chloride); vinylidene chloride–acrylonitrile copolymers; ethyl acrylate–2-chloroethyl vinyl ether copolymers; poly(ethyl acrylate); poly(ethyl methacrylate); poly[3,3-bis(chloromethyl) oxetane]; vinyl modified poly(dimethyl siloxane); polychloroprene; butadiene–acrylonitrile copolymers; and the like.

The modified polymers of this invention resulting from the reaction of the sulfonazide portion or portions of the sulfonazide-isocyanate compounds with the above receptive polymers are both useful in themselves and necessary intermediates in further modifications of this invention. The amount of sulfonazide-isocyanate compound used to modify a receptive polymer will depend upon the modification desired and the desired end use. In general, however, the amount will be from about 0.01% to about 40% by weight based on the weight of the polymer. The resulting modified polymers are quite stable as long as they are kept dry. They exhibit new and improved static properties, adhesion properties, launderability, etc.

Modification can be carried out by admixing the required amount of sulfonazide-isocyanate compound with a receptive polymer and heating to a temperature sufficient to react the sulfonazide portion or portions of the compound with the polymer. This temperature will be in the range of from about 120° to about 240° C. In certain cases it may be desirable to use a sulfonazide-carbonyl azide intermediate which rearranges to form the corresponding sulfonazide-isocyanate compound. The use of the intermediate is particularly advantageous in the presence of water. Since the carbonyl azide groups do not react with water, the intermediate can be used in the form of an aqueous dispersion. Then the water can be removed by evaporation before heating to rearrange the carbonyl azide groups to isocyanate groups. The rearrangement occurs at a temperature in the range of from about 30° to about 100° C.

In one modification of this invention the sulfonazide-isocyanate compounds are used to cross-link, i.e. vulcanize, receptive polymers. To effect cross-linking the receptive polymer is first modified by reaction with a sulfonazide-isocyanate compound as described above and then treated with a poly-functional compound which reacts with the free isocyanate groups on the polymer. Various poly-functional compounds can be used in this cross-linking, however, most preferred are the polyamines such as, diethylene triamine, ethylene diamine, m-phenylene diamine, 4,4'-methylene dianiline, etc. and the polyalcohols such as ethylene glycol, triethylene glycol, 1,4-butanediol, trimethylolpropane, etc. When using one of these compounds the amino groups or hydroxyl groups are believed to react with a free isocyanate group tying together, i.e. cross-linking the polymer chains. Instead of using a polyfunctional compound which is believed to react with the free isocyanate groups one may use water which converts some of the free isocyanate groups to amines. The resulting amines are believed to react with the remaining isocyanate groups cross-linking the polymer chains.

In another modification of this invention the sulfonazide-isocyanate compounds are used to bond various polymers to certain substrates selected from siliceous materials, metals, and other polymers. A typical example of the bonding process of this invention is the bonding of poly(ethylene terephthalate) tire cord to rubber tire stock. The said polyester tire cord is first modified with the sulfonazide-isocyanate compound. In so doing it is believed the azido portion or portions react with the polyester leaving the isocyanate portion or portions free for later reactions. Next the tire cord may be treated with a standard industrial dip which is compatible with the rubber in which the cord is to be embedded. The dip is a conventional tire cord adhesive essentially comprising a mixture of a phenolaldehyde resin and a rubber latex. If desired, the dip in the conventional tire cord adhesive can be omitted with a proportionate decrease in adhesive strength. Finally, the thus treated tire cord is embedded in a commercial vulcanizable tire stock and cured. While polyester tire cords are mentioned various other synthetic fibers useful as tire cords can be incorporated in rubber tire stock in accordance with this invention. Such other tire cords are for example, polyolefins, polyamides, polycarbonate and rayon fibers. Improved adhesion of the synthetic fibers to rubber can be obtained by the process of this invention no matter what the physical form of these fibers. The tire cord can be treated with the sulfonazide-isocyanate compound by any conventional means for example by dipping, spraying, brushing, or running the cord over a coated roll with a solution of the sulfonazide-isocyanate compound in a suitable liquid. Exemplary of suitable organic solvents for the sulfonazide-isocyanate compounds are trichloroethane, ethylene dichloride, benzene, toluene, methyl ethyl ketone, acetone, etc. After the sulfonazide-isocyanate is applied to the cord, the coated cord is heated to a temperature above the decomposition point of the sulfonazide groups resulting in modification of the cord. Various amounts of the sulfonazide-isocyanate treating compound can be used. The optimum amount will depend upon the amount of modification of the cord desired, the specific sulfonazide-isocyanate used, etc. In general, the amount added, based on the cord, will be from about 0.5 to about 2.0% by weight. As indicated above, the thus modified tire cord may be treated with a conventional tire cord adhesive. This adhesive comprises a mixture of a resin, preferably prepared from resorcinol and formaldehyde, admixed with a latex, which is basically a styrene–butadiene–vinyl pyridine terpolymer. The vinyl pyridine content of the terpolymer, is usually from about 5 to about 25%, the styrene content from about 5 to about 35%, and the butadiene content from about 50 to about 85%. In some cases it may be desirable to add a small amount of a latex of the polymer comprising the rubber tire stock. For example, if the rubber tire stock is an ethylene–propylenee–diene terpolymer, it may be desirable to add a small amount of a latex prepared from that terpolymer to the styrene–butadiene–vinyl pyridine terpolymer latex. If the rubber tire stock contains styrene–butadiene rubber there is, of course, no need to add styrene–butadiene latex to the terpolymer latex. The latex is applied to the modified tire cord by dipping, spraying, running the cord over a coated roll or other conventional procedure. The mount of latex added will be from about 2 to about 10% by weight of the cord. It is believed that the isocyanate groups on the modified tire cord react with the tire cord adhesive. The thus treated tire cord is then embedded in a vulcanizable tire stock and cured under pressure. The vulcanizable tire stocks in which the coated cord can be used as a reinforcing medium include natural rubber, and synthetic rubbers such as styrene–butadiene rubber, ethylene–propylene–diene terpolymer rubbers, polybutadiene, polyisoprene, and mixtures and blends thereof with suitable fillers, pigments, antioxidants, and cross-linking agents such as sulfur, dicumyl peroxide, etc.

Another typical example of bonding a polymer to a substrate using a sulfonazide-isocyanate compound is the bonding of an alpha-olefin polymer such as polypropylene, to a glass substrate. Said glass substrate, such as glass cloth, is first treated with an amino silane compound. In so doing, the silane portion of the compound reacts with the substrate leaving the amine portion free for later reaction with the isocyanate portion of the sulfonazide-isocyanate compound. Next polypropylene having been modified with a sulfonazide-isocyanate compound so as to react the sulfonazide portion or portions with the polymer leaving the isocyanate portion free is placed in contact with the above described treated glass. The free amine groups on the treated glass react with the free isocyanate groups on the modified polymer forming a tight bond between the polymer and glass substrate.

Still another typical example of bonding a polymer to a substrate using a sulfonazide-isocyanate compound is the bonding of an alpha-olefin polymer to a metal substrate such as a steel sheet. The steel sheet will first be treated with a priming agent, such as an amino silane compound, which possesses a group or groups which will bond to the metal surface leaving a free functional group or groups which are capable of reaction with the isocyanate group or groups on the sulfonazide-isocyanate compound. The process of bonding the alpha-olefin polymer to the steel sheet can be carried out in various ways. For example, the sheet can be coated with a solution or suspension of the priming agent, allowed to dry, then coated with a solution or suspension of the sulfonazide-isocyanate compound, allowed to dry and finally contacted with the alpha-olefin polymer at the decomposition temperature of the azide. By another method, the sheet can be coated with the priming agent, then contacted with both the sulfonazide-isocyanate compound and the alpha-olefin polymer at the decomposition temperature of the azide. By still another method, the priming agent, sulfonazide-isocyanate compound and alpha-olefin polymer can be deposited together on the sheet and then heated.

The substrates to which the polymers may be bonded in accordance with this invention include siliceous materials such as glass, asbestos, sand, clay, concrete, brick, ceramic material, etc.; metals such as aluminum, cadmium, chromium, copper, magnesium, nickel, silver, tin, iron, titanium, zinc, etc.; alloys of the metals such as steel, brass, bronze, nickel chrome, etc. and including metals which have been surface treated with phosphates, chromates, etc. or on the surface of which oxides have formed; and other polymers. By the term "other polymers" is meant any polymer other than the polymer which is to be bonded. These substrates can be in various forms such as sheets, plates, blocks, wires, cloth, fibers, particles, etc.

The following examples will serve to illustrate the invention, all parts and percentages being by weight unless otherwise indicated.

EXAMPLE 1

This example illustrates the preparation of isocyanato-pentanesulfonyl azide isomers.

A solution of 402 grams of hexanoyl chloride in 3300 grams of methylene chloride was prepared and cooled to 5° C. Sulfur dioxide was bubbled into the solution at a rate of 300 cc's per minute. After 15 minutes the addition of chlorine gas was started at a rate of approximately 150 cc's per minute. The two gases were continuously bubbled through the solution under ultraviolet radiation for 5 hours at a temperature of 5° C. The ultraviolet radiation was continued for an additional 30 minutes after the discontinuance of addition of the gases. The solvent was removed under vacuum and the product heated to 65° C. at 1 mm pressure to remove any unreacted hexanoyl chloride. The resulting yellow oily product was identified as mixed chlorosulfonated isomers of hexanoyl chloride by infrared analysis. To a slurry comprising 130 parts of sodium azide, 100 parts of water and 237 parts of acetone was added 116 parts of the mixed isomers of chlorosulfonated hexanoyl chloride, dropwise with rapid stirring at a temperature of −5° to 0° C. After stirring for an additional 2 hours at 0° C. 300 parts of ice water and 440 parts of cold benzene were added. The benzene layer was separated, washed three times with cold water and dried over magnesium sulfate. The resulting pale yellow solution was slowly warmed and then refluxed for 1 hour. After removing the solvent approximately 100 parts of mixed isomers of isocyanatopentanesulfonyl azide was obtained. A typical infrared spectrum of this product displayed a strong isocyanate peak at 2265 cm$^{-1}$, a strong azide peak at 2135 cm$^{-1}$ as well as sulfer dioxide peaks at 1365 cm$^{-1}$ and 1165 cm$^{-1}$. The results of an analysis of the product for nitrogen, sulfur and chlorine is tabulated below:

| Calculated for $C_6H_{9.6}Cl_{0.3}N_{3.4}O_{2.6}S_{0.8}$ | | Found |
|---|---|---|
| N | 23.0 | 23.3 |
| S | 12.3 | 12.3 |
| Cl | 5.1 | 5.8 |

EXAMPLE 2

This example illustrates the preparation of 4-isocyanatophenyloxy-3-propanesulfonyl azide.

A mixture of 26 parts of 4-carboxyphenyloxy-3-propanesulfonic acid, 59 parts of thionyl chloride, and a small amount of dimethylformamide catalyst was gently refluxed for 4 hours in a nitrogen atmosphere. The reaction mixture was then stripped under vacuum of unreacted thionyl chloride to yield 27 parts of bis-acid chloride precursor. This precursor was added with rapid stirring to a slurry comprising 26 parts of sodium azide, 25 parts of water, and 70 parts of acetone at a temperature of 0° C. After stirring for 2 hours at 3° C. 150 parts of ice water and 100 parts of cold benzene were added. The benzene layer was separated and washed three times with ice water and then dried over magnesium sulfate. The benzene solution was gently refluxed for 6 hours, then the solvent was removed to give the 4-iso-cyanatophenyloxy-3-propanesulfonyl azide product. A typical infrared spectrum of this product displayed a strong isocyanate peak at 2265 cm$^{-1}$ and a strong azide peak at 2135 cm$^{-1}$. The results of an infrared analysis of the product for percent azido nitrogen and isocyanate is tabulated below:

| | Calculated | Found |
|---|---|---|
| Nitrogen | 14.8 | 14.5 |
| Isocyanate | 14.8 | 14.1 |

EXAMPLE 3

This example illustrates the preparation of 4-isocyanato-cyclohexanesulfonyl azide.

To a slurry comprising 13 parts of sodium azide, 20 parts of water and 40 parts of acetone was added 12 parts of 4-chlorosulfonylcyclohexanecarbonyl chloride with rapid stirring at a temperature of −5° C. After stirring for 2 hours at 0° C. 125 parts of ice water and 78 parts of cold benzene were added. The benzene layer was separated and washed three times with ice water and then dried over magnesium sulfate. The solution was then gently refluxed for 5 hours. Solvent was removed from the resulting clear yellow solution to give the 4-isocyanatocyclo-hexanesulfonyl azide. A typical infrared spectrum of this product displayed a strong isocyanate peak at 2265 cm$^{-1}$ and a sharp azide peak at 2135 cm$^{-1}$. The results of an infrared analysis of the product for percent azido nitrogen and isocyanate is tabulated below:

| | Calculated | Found |
|---|---|---|
| Nitrogen | 18.2 | 17.9 |
| Isocyanate | 18.2 | 17.6 |

EXAMPLE 4

This example illustrates the use of the 4-isocyanato-cyclohexanesulfonyl azide of Example 3 in cross-linking polyethylene.

To an acetone slurry of 100 parts of linear high density polyethylene flakes having a melt index of 0.6 ($I_2$ at 190° C.) and 0.5 part of 4,4'-thiobis(6-tertiary-butyl-m-cresol) antioxidant was added 5 parts of 4-isocyanatocyclohexanesulfonyl azide. The acetone was evaporated from the slurry in a nitrogen atmosphere at a temperature of 60° C. The resulting mixture was molded into plaques 6 inches square and 6 mils thick by heating in metal molds for 30 minutes at a temperature of 180° C. Sample plaques equivalent to 10 parts by weight were milled with 0.3 parts of diethylenetriamine on a two roll mill at a temperature of 145° C. and then cured for 30 minutes at a temperature of 160° C. The product had been cross-linked as evidenced by its insolubility in hot decahydronaphthalene. A control sample prepared in exactly the same way except for the addition of the 4-isocyanato-cyclohexanesulfonyl azide was completely soluble in hot decahydronaphthalene.

EXAMPLE 5

This example illustrates the cross-linking of poly-ethylene with the 4-isocyanatocyclohexanesulfonyl azide of Example 3 and water.

Polyethylene was modified with 4-isocyanatocyclohexanesulfonyl azide and formed into plaques as described in Example 4. Sample plaques were placed in boiling water for 1 hour and then tested for cross-linking. The thus boiled plaques had been cross-linked as evidenced by their insolubility in hot decahydro-naphthalene. A control plaque prepared the same way except for the addition of 4-isocyanatocyclohexanesulfonyl azide was completely soluble in the hot decahydronaphthalene.

EXAMPLE 6

This example illustrates the preparation of 5-isocyanatopentanesulfonyl azide.

To 72 parts of 6-sulfohexanoic acid and a small amount of dimethylformamide catalyst was added 143 parts of thionyl chloride over a period of 30 minutes. The reaction mixture was warmed to 85° C. and gently refluxed for 3 hours. The reaction mixture was then stripped under vacuum of unreacted thionyl chloride to yield 6-chlorosulfonylhexanoyl chloride. To a slurry comprising 78 parts of sodium azide, 100 parts of water and 200 parts of acetone was added 68 parts of the 6-chlorosulfonylhexanoyl chloride with rapid stirring at a temperature of −5° C. After stirring for 2 hours at 0° C. 500 parts of ice water and 350 parts of cold benzene were added. The benzene layer was separated and washed three times with water and then dried over magnesium sulfate. The thus dried solution was gently refluxed for 4 hours in a nitrogen atmosphere. The benzene solvent was removed to yield the 5-isocyanatopentanesulfonyl azide. The results of an infrared analysis of the product for percent azido nitrogen and isocyanate is tabulated below:

|  | Calculated | Found |
|---|---|---|
| Nitrogen | 19.2 | 18.6 |
| Isocyanate | 19.2 | 18.9 |

EXAMPLE 7

This example illustrates the use of the 5-isocyanatopentanesulfonyl azide of Example 6 in bonding polyester tire cord to rubber tire stock.

Poly(ethylene terephthalate) tire cord 1,000 denier and 3 ply under about 500 grams of tension was passed twice through a trough containing a 5% solution of the 5-isocyanatopentanesulfonyl azide of Example 6 in trichloroethylene. The cord was next passed through two ovens in series at 200° F. and 400° F. Residence times in the ovens were 65 and 54 seconds respectively. The cord dip pick-up was approximately 1% by weight.

The modified cord was next dipped in a resorcinol-formaldehyde latex prepared as follows: To a solution of 0.24 part of sodium hydroxide in 192.8 parts of water was added 8.8 parts of resorcinol with continued stirring until a complete solution was achieved. Then 12.2 parts of 37% formaldehyde was added. The solution was aged for approximately 5 hours at about 75° C. and then added slowly to a mixture of 48 parts water and 195 parts of a commercial latex comprising a terpolymer of styrene, butadiene and vinyl pyridine, the monomers being present in a ratio of approximately 50:70:15. The mixture was stirred slowly for 15 minutes and its pH adjusted to 10.3 using concentrated ammonium hydroxide. The resulting gray-violet latex contained approximately 20% solids. The sulfonazide-isocyanate modified cord was passed twice through a trough of the above described latex under a tension of 500 grams and then dried and cured for 54 seconds at a temperature of 430° F.

The thus coated cord was then vulcanized with a rubber tire stock in the form of ⅝ inch H-specimens. The rubber tire stock has the following formulation:

| Compounds | Parts |
|---|---|
| Natural rubber (smoked sheet) | 80 |
| Styrene butadiene rubber | 20 |
| Semi-reinforcing furnace black | 25 |
| Zinc Oxide | 5 |
| Stearic acid | 2 |
| Polytrimethyl dihydroquinoline | 1 |
| Heavy pine tar | 0.5 |
| Benzothiazyl disulfide | 1 |
| Tetramethyl thiuram disulfide | 0.1 |
| Sulfur | 2.6 |

The test specimens were cured for 45 minutes at a temperature of 307° F. After several hours conditioning at room temperature the H-specimens were tested according to the procedure of ASTM D–2138–62T. An average (6 test specimens) of 35 pounds was required to overcome the tire cord-rubber adhesions. A control specimen treated exactly the same as above except for the sulfonazide-isocyanate treatment gave an average of 16.8 pounds required to overcome the tire cord-rubber adhesion.

EXAMPLE 8

This example illustrates the use of a precursor of the 4-isocyanatocyclohexanesulfonyl azide of Example 3 in bonding a latex paint to polypropylene film.

Cast polypropylene film 5 mil thick was coated with an unpigmented latex paint containing the 4-carbonyl azide-cyclohexanesulfonyl azide intermediate from Example 3. The composition of the latex paint was as follows:

| Compounds | Parts |
|---|---|
| Poly(ethylene-vinyl acetate) | 45 |
| Polyvinyl alcohol | 4 |
| 4-carbonyl azide-cyclohexane-sulfonyl azide | 4 |
| Non-ionic surface active agent* | 4 |
| Water | 43 |

*polyoxy alkylene derivative of sorbitan monolaurate

The film coated with the above latex paint was dried at room temperature and then in a stream of dry nitrogen at a temperature of 50° C. The thus coated film was heated to a temperature of 135° C. to decompose the azides. The treated film was then heat sealed at 145° C. for 15 seconds at 15 p.s.i. A control sample was prepared the same way except for the addition of the 4-carbonyl azide-cyclohexanesulfonyl azide intermediate. The peel strength of the latex paint containing the intermediate was approximately 3 times greater than the peel strength of the sample.

EXAMPLE 9

This example illustrates the bonding of polypropylene to glass cloth using 5-isocyanatopentanesulfonyl azide.

Twelve (12) ply laminates of glass cloth and polypropylene film were prepared using 181 style electrical glass woven cloth, heat cleaned and having a weight of 8.9 ounces per square yard, and 5 mil film of crystalline polypropylene. Sheets of the glass cloth were first immersed in a 0.5% aqueous solution of γ-aminopropyltriethoxysilane, dried at room temperature and then heated in a forced air oven at 120° C. for 1 hour. The thus treated cloth was immersed in a benzene solution containing 0.5% by weight of 5-isocyanatopentanesulfonyl azide for 4 hours. The sheets of cloth were then removed, air dried and laid up to form the laminate by alternating plies of the treated glass cloth and sheets of the polypropylene film. The resulting assembly was compression molded at a temperature of 240° C. for 5 minutes at contact pressure, 3 minutes at a pressure of 500 p.s.i. and then cooled to 23° C. under 500 p.s.i. to form a ⅛ inch thick laminate. A control laminate was prepared exactly as described above except for the treating with the 5-isocyanatopentanesulfonyl azide. Test specimens 1 inch by 3 inches were cut from the laminate and tested for flexural strength according to American Standard Testing Method D–790 in a 2 inch span at 0.05 inch/minute crosshead speed. The laminate treated with the sulfonazide-isocyanate compound had a flexural strength approximately twice that of the control.

EXAMPLE 10

This example illustrates the bonding of a polymer to an aluminum panel using 5-isocyanatopentanesulfonyl azide.

An aluminum panel 1 × 4 inches and 1/16 inch thick was cleaned, degreased in trichloroethylene vapor, etched with dilute chromic acid, washed with distilled water and dried. The panel was then primed by immersing in a 0.5% methanol-water solution of γ-aminopropyltriethoxysilane and dried in a forced air oven at 120° C. for 2 hours. The thus primed panel was dipped in a colloidal suspension of approximately 20–22% total solids crystalline polypropylene particles and containing about 0.75% by weight of 5-isocyanatopentanesulfonyl azide in benzene. The coated panel was air dried, baked at a temperature of 240° C. for eight minutes and then allowed to cool. A control was prepared exactly as described above except for the addition of the 5-isocyanatopentanesulfonyl azide. The coating on each panel was tested for adherence by scoring with a razor blade and then drawing the edge of a metal coin firmly across the thus scored surface. The coating on the panel containing the sulfonazide-isocyanate compound was not removed. The coating on the control panel stripped easily from the aluminum substrate.

What I claim and desire to protect by Letters Patent is:

1. A process of adhering a polymer, containing more than one monomer unit capable of combination reaction with a sulfonazide radical, to a substrate selected from the group consisting of siliceous materials, metals, and other polymer substrates which comprises the steps of (1) modifying said polymer by heating in admixture with a small amount of a sulfonazide-isocyanate compound having the formula

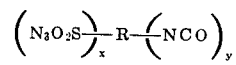

wherein R is a polyvalent aliphatic radical and $x$ and $y$ are integers from 1 to 10, and (2) coupling said polymer to said substrate through the isocyanato groups.

2. The process of claim 1 wherein the said substrate has been primed with a material compatible with said substrate having free functional groups selected from amine and hydroxyl groups.

3. The process of claim 2 wherein said substrate has been primed with an amino silane compound.

4. The process of claim 1 wherein the said substrate is glass fibers.

5. In a process of adhering fibrous polyester reinforcing material to rubber stock, the improvement of first contacting said reinforcing material with a sulfonazide-isocyanate compound having the formula

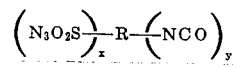

wherein R is a polyvalent aliphatic radical and $x$ and $y$ are integers from 1 to 100 and heating the thus contacted material to a temperature sufficient to cause substantial decomposition of the sulfonazide groups on the sulfonazide-isocyanate compound.

* * * * *

PO-1050
(5/69)

UNITED STATES PATENT OFFICE
CERTIFICATE OF CORRECTION

Patent No. 3,657,047             Dated April 18, 1972

Inventor(s) David S. Breslow (Case 49)

It is certified that error appears in the above-identified patent and that said Letters Patent are hereby corrected as shown below:

Line 4 of abstract; "yo" should read --to--

Line 7 of abstract; "modi3/4ed" should read --modified--

Column 1, line 53; "7-chloro-" should read --7-isocyanato- --

Column 6, line 12; "sulfer" should read --sulfur--

Column 6, line 13; "1165 $cm^{-6}$" should read --1165 $cm^{-1}$--

Signed and sealed this 8th day of August 1972.

(SEAL)
Attest:

EDWARD M. FLETCHER, JR.      ROBERT GOTTSCHALK
Attesting Officer               Commissioner of Patents